Patented Aug. 22, 1939

2,170,416

UNITED STATES PATENT OFFICE 2,170,416

LAMINATED CLOTH

Harry W. Klinger, Wilmington, Del., assignor to Hercules Powder Company, Wilmington, Del., a corporation of Delaware No Drawing. Application March 4, 1936, Serial No. 67,075

15 Claims. (Cl. 154—46)

My invention relates to articles of laminated cloth, such as, for example, shirt collars, shirt fronts, dress shirt bosoms, and the like, and to methods of producing such articles.

It has heretofore been known to produce laminated cloth articles of this type by joining an outer, finely woven cloth to a relatively coarse base fabric by means of some adhesive or bonding material, usually a layer or sheet of thermoplastic, such as, for example, nitrocellulose, cellulose acetate, various synthetic resins, etc. These laminated cloth articles are designed to possess the property of retaining permanently a stiffened or starched appearance despite repeated laundering, and without the subsequent use of starch or other stiffening material.

Such laminated cloth articles as heretofore produced, however, have not been entirely satisfactory for various reasons. A serious difficulty encountered when using cellulose acetate or nitrocellulose as a bonding material is the destruction of adhesion and resiliency of the bonding material upon repeated laundering, particularly in the presence of small amounts of alkali, with consequent separation of the layers of fabric. Other bonding materials show a tendency to "bleed" through the outer layer of cloth and so discolor and spoil the article.

Now, I have found that articles of laminated cloth adhered with a thermoplastic composition in which the adhesive ingredient is a mixed fatty acid ester of cellulose, characterized by a melting point within the range of about 130° C. to about 220° C. as measured by the capillary method and by a moisture absorption of not more than about 5.5% by weight, from the precipitated, bone-dry state in an atmosphere having a relative humidity of 85% and a temperature of 22° C., within a period of 20-24 hours, show superior resistance to loss of adhesion and resiliency on washing in alkaline soap solutions, and can be readily produced without bleeding. The organic esters of cellulose used by the prior art have not shown this combination of properties.

The laminated cloth article, in accordance with this invention, will comprise a plurality of layers of cloth of any desired type, adhered and bonded together by means of the thermoplastic composition hereinbefore specified. In the production of such a laminated cloth article, the laminations of cloth, one or both of which may be coated with the thermoplastic cellulose ester bonding material, or which may have positioned between them a sheet of such bonding material, are united by heat and pressure to form the laminated article.

The sheet of bonding material may be a continuous film of the cellulose ester composition, or it may be a cloth woven from threads of the cellulose ester composition. When a woven cloth is used as the bonding layer, such may be made entirely of threads of the cellulose ester bonding composition or it may be made of such threads alternated with other textile threads such as cotton, wool, rayon, etc. Again, the sheet of bonding material may be a cloth woven from thread or threads which have been coated with the cellulose ester bonding composition described herein. Thus, threads of cotton, wool, rayon, or the like may be coated by passage through a solution of the cellulose ester bonding composition, and then woven into a cloth, which is satisfactory for use as bonding sheet.

The mixed fatty acid ester of cellulose used in the thermoplastic bonding composition for the production of laminated articles, in accordance with this invention, may be any such ester provided that the melting point of the said ester is within the range of about 130° C. to about 220° C. and the moisture absorption is not more than 5.5%.

The organic esters listed in Table I, may be cited as illustrations of mixed fatty acid esters of cellulose having a capillary melting point within the range of about 130° C. to about 220° C. and a moisture absorption of not more than 5.5%, and which, hence, are adapted for use as the adhesive ingredient in the thermoplastic bonding compositions for the production of laminated articles, in accordance with this invention.

Table I

| Cellulose ester | Analysis | Capillary melting point | Moisture absorption |
|---|---|---|---|
| | | ° C. | Percent |
| Acetopalmitate | 21% acetyl-36% palmityl. | 150 | 1.8 |
| Acetobutyrate | 26% acetyl-13% butyryl. | 210 | 4.6 |
| Acetopropionate | 10% acetyl-34% propionyl. | 195 | 3.3 |
| Do | 23% acetyl-23% propionyl. | 215 | 2.2 |
| Acetostearate | 25% acetyl-24% stearyl. | 160 | 1.7 |

The organic esters of cellulose listed in Table I are given merely by way of illustration of specific cellulose esters which show the combination of melting point and moisture absorption which a cellulose ester must have to be suitable for the production of the improved laminated articles, in accordance with this invention. There are many other mixed fatty acid esters of cellulose which have melting points within the range of about 130° C. to about 220° C. and moisture absorptions of not more than 5.5%, and which are, likewise, suitable for use in the production of my improved laminated cloth. Thus for example, any cellulose acetopropionate characterized by an acetyl-propionyl content within the range of about 10% acetyl-34% propionyl to about 26% acetyl-18% propionyl, any cellulose acetobutyrate characterized by an acetyl-butyryl content within the range of about 11% acetyl-39% butyryl to about 33% acetyl-10% butyryl, any cellulose acetopalmitate characterized by an acetyl-palmityl content within the range of about 18.1% acetyl-44.8% palmityl to about 35.6% acetyl-16.3% palmityl, or any cellulose acetostearate characterized by an acetyl-stearyl content within the range of about 20.1% acetyl-41.6% stearyl to about 35.6% acetyl-16.6% stearyl, is suitable for the production of laminated cloth, in accordance with this invention.

Two important characteristics have been specified, which a mixed fatty acid ester of cellulose must have to produce my improved laminated cloth. These characteristics are a melting point within the range of about 130° C. to about 220° C., and a maximum moisture absorption of 5.5% from the precipitated, bone-dry state, in an atmosphere having a relative humidity of 85% and a temperature of 22° C., within a period of 20–24 hours. In connection with the characteristic of moisture absorption, it will be appreciated that the maximum amount of moisture which a cellulose ester will absorb, depends upon the relative humidity and temperature of the air to which it is exposed, and that when a figure for moisture absorption is specified, the conditions of temperature and of relative humidity must also be specified. I have selected a temperature of 22° C. and a relative humidity of 85% for the determination of the moisture absorption of the cellulose esters used in the production of laminated cloth, merely as a matter of convenience. It will be noted, however, that had I selected some temperature other than 22° C. and/or some relative humidity other than 85%, that the maximum value for the moisture absorption of the cellulose ester which I may use will be some value other than 5.5%. The rate at which moisture is absorbed by a cellulose ester is dependent on its physical condition, and it is well known that cellulose ester in the precipitated state absorbs moisture rapidly. A cellulose ester in the precipitated, bone-dry state will absorb substantially a maximum amount within a period of 20 hours at relative humidity of 85% and 22° C., and additional exposure will not make any appreciable increase in the amount of moisture absorbed.

The thermoplastic composition used for the production of laminated articles, in accordance with this invention, will desirably include a modifying ingredient or modifying ingredients, such as, a plasticizer and/or a resin, in addition to an organic ester of cellulose having a melting point within the range of about 130° C. to about 220° C. and a moisture absorption of not more than 5.5%, or mixture of such esters. The plasticizer or resin included should be compatible with the cellulose ester used, and resistant to alkaline soap solutions. Suitable plasticizers for this purpose are, for example, metylphthalylethyl glycollate, ethylphthalylethyl glycollate, butylphthallylbutyl gycollate, dimethyl phthalate, diethyl phthalate, dibutyl phthalate, glycerol tripropionate, glycerol tributyrate, etc. Suitable resins for the purpose are, for example, the toluenesulfonamideformaldehyde condensation type resins, the fatty acid modified-polybasic acid-polyhydric alcohol type resins, sucrose octa-acetate, phenolformaldehyde type resins, vinyl resins, etc.

The exact amount of plasticizer included in the thermoplastic composition, will depend on the melting point of the cellulose ester used and on the characteristics of the resin, if such is included, and will usually be included in amounts within the range of about 5 parts to about 50 parts by weight per 100 parts of the cellulose ester by weight. The exact amount of resin included will, likewise, depend on the melting point of the cellulose ester used and on the characteristics of the plasticizer, if such is included, and will usually be included in amounts within the range of about 5 parts to about 70 parts by weight per 100 parts of the cellulose ester by weight.

The thermoplastic composition may be conveniently applied to cloth for lamination, in the form of a solution in a volatile solvent, or solvent mixtures. The particular solvent or solvent mixture used, will depend on the particular cellulose ester, and other formulating ingredients present. Thus, for example, a mixture of acetone and alcohol, or of acetone and ethylene dichloride will usually be found satisfactory for the purpose. Alternately, such a solution may be cast to form a film, and the dried film placed between the layers of cloth to be laminated. The film or sheet of bonding material for use in this manner will desirably have a thickness of not less than 0.001 inch, and preferably a thickness of about 0.002 inch. Such solution may be spun into thread and then woven into cloth, either alone or with other thread, and such cloth placed between the layers of cloth to be laminated. Again, threads of cotton, wool, rayon, etc., may be coated with such a solution and the coated threads woven into cloth placed between the layers of cloth to be laminated.

The uniting and consolidation of the layers of cloth with the intermediate layer of bonding material, in whatever form present, may be effected by applying heat and pressure by known methods, as with, for example, heated pressing irons, heated pressure rolls, etc. The temperature of the pressing means may be varied from the lowest at which softening of the bonding composition takes place, about 110° C.–125° C., depending upon the exact composition of the bonding adhesive, to that at which decomposition or excessive fluidity of the bonding composition occurs, which temperature will of course depend on the time of pressing, the thickness of the adhesive layer, etc. A temperature within the range of about 115° C. to about 150° C. is usually satisfactory, and I prefer to use a temperature within the range of about 115° C. to about 140° C. The time of pressing will likewise depend upon the temperature, and will usually be within the range of about 0.5 to 5.0 minutes. The pressure used may be varied widely, but a pressure within the range of about 100 to about 300 lbs/sq. in. is usually practical.

The following compositions may be cited as examples of solutions of thermoplastic compositions for use as adhesives in the production of laminated cloth articles, in accordance with my invention.

*Example I*

| | Parts |
|---|---|
| Cellulose ester | 6 |
| Dimethyl phthalate | 1.5 |
| Acetone | 15.3 |
| Ethylene dichloride | 7 |

*Example II*

| | Parts |
|---|---|
| Cellulose ester | 15 |
| Methylphthalylethylglycollate | 4 |
| Acetone | 45 |
| Alcohol | 11 |

The cellulose ester used in the examples may be any mixed fatty acid ester of cellulose having a melting point within the range of about 130° C. to about 220° C. and a moisture absorption of not more than about 5.5%, as, for example, any of the esters mentioned hereinbefore. These solutions may be coated directly on the fabric to be adhered and dried to films thereon, or they may be dried to form suitable films and these films positioned between the sheets of fabric to be adhered, and then the layers of fabric adhered by heat and pressure, as, for example by pressing at a temperature of 120° C. and a pressure of 225 pounds per square inch for a period of 1.5 minutes.

The following comparison gives illustration of the properties of the laminated cloth made in accordance with this invention, in comparison with laminated cloth made according to the prior art. Three samples of cellulose acetopropionate and of cellulose acetobutyrate, respectively, and two samples of cellulose acetate which were selected for test showed the properties listed in Table II.

*Table II*

| Sample No. | Cellulose ester | Capillary melting point | Moisture absorption |
|---|---|---|---|
| | | °C. | Percent |
| 1 | Acetopropionate | 223–228 | 2.18 |
| 2 | do | 205–210 | 3.18 |
| 3 | do | 200–205 | 4.40 |
| 4 | Acetobutyrate | 228–230 | 2.15 |
| 5 | do | 215 | 2.76 |
| 6 | do | 190 | 3.60 |
| 7 | Acetate (56% acetate) | 230 | 5.7 |
| 8 | Acetate (50.5% acetate) | 225 | 10–15 |

Each of these cellulose esters was made up into a solution of the following formula:

| | Parts by weight |
|---|---|
| Cellulose ester | 4 |
| Diethyl phthalate | 2 |
| Acetone | 6 |
| Ethyl acetate | 9 |
| Ethyl lactate | 4 |

For #6 it was necessary to add 4 parts by weight of acetone and 4 parts by weight of ethyl alcohol to the above mixture to get solution. Each of these solutions was then cast as a film on a sheet of interliner cloth and dried. The sheets of coated interliner cloth were then placed between sheets of finishing cloth and pressed at a pressure of 225 pounds per square inch and a temperature of 120° C. for 1.5 minutes. These samples of laminated cloth were then immersed in a hot 1% aqueous solution of sodium hydroxide to test their resistance to alkaline washing solutions. The results of these tests are given in Table III:

*Table III*

| Cellulose ester in bonding composition | Adhesion of bond as pressed | Adhesion after immersion in 1% sodium hydroxide solution at 100° C. | | |
|---|---|---|---|---|
| | | ½ hour | 1 hour | 2 hours |
| Acetopropionate (1) | Poor | | (Not tested) | |
| Acetopropionate (2) | Good | Good | Good | Fair. |
| Acetopropionate (3) | do | do | do | Good. |
| Acetobutyrate (4) | Poor | | (Not tested) | |
| Acetobutyrate (5) | Good | Good | Good | Fair–good. |
| Acetobutyrate (6) | do | do | do | Good. |
| Acetate (7) | do | Slight | Very slight | None. |
| Acetate (8) | Fair | None | | |

A comparison of the data listed in Table III with the properties of the cellulose esters used in bonding the samples tested listed in Table II shows that the cellulose esters (Nos. 2, 3, 5, and 6), having a melting point within the range of about 130° C. to about 220° C. and a moisture absorption of not more than 5.5%, gave much better adhesion initially or showed up much better under the drastic test of immersion in a 1% aqueous solution of sodium hydroxide at 105° C. than the cellulose esters (1, 4, 7, and 8), having either melting points or moisture absorptions outside these limits. Again, such comparison shows that cellulose acetate, which has found wide commercial use in laminating cloth, has a moisture absorption above 5.5%, as shown by the properties of samples 7 and 8, Table II, and that the resistance of cloth laminated with cellulose acetate to alkaline washing is decidedly inferior to samples of laminated cloth made in accordance with this invention, as shown by the data listed in Table III.

It will be understood that the details and examples hereinbefore set forth are illustrative only, and that the invention as herein broadly described and claimed is in no way limited thereby.

It will be further understood that in the appended claims, where melting points are specified, that melting points determined by the capillary method are meant, and that where the moisture absorption of a cellulose ester is specified, that moisture absorption as measured by the gain in weight of the cellulose ester in the precipitated, bone-dry state when exposed for a period of 20–24 hours at 22° C. to moist air having a relative humidity of 85%, is meant.

What I claim and desire to protect by United States Letters Patent:

1. An article comprising a plurality of layers of cloth adhered by means of a bonding composition including a cellulose acetopropionate, the said cellulose ester constituting the major proportion of the composition and being characterized by an analysis within the range of about 10% acetyl—34% propionyl to about 26% acetyl—18% propionyl, a melting point within the range of about 130° C. to about 220° C., and a moisture absorption of not more than 5.5%, the said article being resistant to the action of alkaline washing solutions.

2. An article comprising a plurality of layers of cloth adhered by means of a bonding composition including a plasticizer and a cellulose acetopropionate, the said cellulose ester constituting the major proportion of the composition and being characterized by an acetyl-propionyl content within the range of about 10% acetyl—34% propionyl to about 26% acetyl—18% propionyl, a melting point within the range of about 130° C. to about 220° C. and a moisture absorption of not more than 5.5%, the said article being resistant to the action of alkaline washing solutions.

3. An article comprising a plurality of layers of cloth adhered by means of a bonding composition including a cellulose acetoproprionate and a resin compatible therewith, the said cellulose ester constituting the major proportion of the composition and being characterized by an acetyl-propionyl content within the range of about 10% acetyl—34% propionyl to about 26% acetyl—18% propionyl, a melting point within the range of about 130° C. to about 220° C. and a moisture absorption of not more than 5.5%, the said article being resistant to the action of alkaline washing solutions.

4. An article comprising a plurality of layers of cloth adhered by means of a bonding composition including a cellulose acetobutyrate, the said cellulose ester constituting the major proportion of the composition and being characterized by an acetyl-butyryl content within the range of about 11% acetyl—39% butyryl to about 33% acetyl—10% butyryl, a melting point within the range of about 130° C. to about 220° C. and a moisture absorption of not more than 5.5%, the said article being resistant to the action of alkaline washing solutions.

5. An article comprising a plurality of layers of cloth adhered by means of a bonding composition including a plasticizer and a cellulose acetobutyrate, the said cellulose ester constituting the major proportion of the composition and being characterized by an acetyl-butyryl content within the range of about 11% acetyl—39% butyryl to about 33% acetyl—10% butyryl, a melting point within the range of about 130° C. to about 220° C. and a moisture absorption of not more than 5.5%, the said article being resistant to the action of alkaline washing solutions.

6. An article comprising a plurality of layers of cloth adhered by means of a bonding composition including a cellulose acetobutyrate and a resin compatible therewith, the said cellulose ester constituting the major proportion of the composition and being characterized by an acetyl-butyryl content within the range of about 11% acetyl—39% butyryl to about 33% acetyl%10% butyryl, a melting point within the range of about 130° C. to about 220° C. and a moisture absorption of not more than 5.5%, the said article being resistant to the action of alkaline washing solutions.

7. An article comprising a plurality of layers of cloth adhered by means of a bonding composition including a cellulose acetopalmitate, the said cellulose ester constituting the major proportion of the composition and being characterized by an acetyl-palmityl content within the range of about 18.1% acetyl—44.8% palmityl to about 35.6% acetyl—16.3% palmityl, a melting point within the range of about 130° C. to about 220° C. and a moisture absorption of not more than 5.5%, the said article being resistant to the action of alkaline washing solutions.

8. An article comprising a plurality of layers of cloth adhered by means of a bonding composition including a plasticizer and a cellulose acetopalmitate, the said cellulose ester constituting the major proportion of the composition and being characterized by an acetyl-palmityl content within the range of about 18.1% acetyl—44.8% palmityl to about 35.6% acetyl—16.3% palmityl, a melting point within the range of about 130° C. to about 220° C. and a moisture absorption of not more than 5.5%, the said article being resistant to the action of alkaline washing solutions.

9. An article comprising a plurality of layers of cloth adhered by means of a bonding composition including a cellulose acetopalmitate and a resin compatible therewith, the said cellulose ester constituting the major proportion of the composition and being characterized by an acetyl-palmityl content within the range of about 18.1% acetyl—44.8% palmityl to about 35.6% acetyl—16.3% palmityl, a melting point within the range of about 130° C. to about 220° C. and a moisture absorption of not more than 5.5%, the said article being resistant to the action of alkaline washing solutions.

10. An article comprising a plurality of layers of cloth adhered by means of a bonding composition consisting essentially of a plasticizer and a cellulose acetopropionate, the plasticizer being in amount within the range of about 5 parts to about 70 parts by weight per 100 parts by weight of the said cellulose ester, and the said cellulose ester being characterized by an acetyl-propionyl content within the range of about 10% acetyl—34% propionyl to about 26% acetyl—18% propionyl, a melting point within the range of about 130° C. to about 220° C. and a moisture absorption of not more than 5.5%, the said article being resistant to the action of alkaline washing solutions.

11. An article comprising a plurality of layers of cloth adhered by means of a bonding composition consisting essentially of a plasticizer and a cellulose aceto-butyrate, the plasticizer being in amount within the range of about 5 parts to about 70 parts by weight per 100 parts by weight of the said cellulose ester, and the said cellulose ester being characterized by an acetyl-butyryl content within the range of about 11% acetyl—39% butyryl to about 33% acetyl—10% butyryl, a melting point within the range of about 130° C. to about 220° C. and a moisture absorption of not more than 5.5%, the said article being resistant to the action of alkaline washing solutions.

12. An article comprising a plurality of layers of cloth adhered by means of a bonding composition consisting essentially of a plasticizer and a cellulose acetopalmitate, the plasticizer being in amount within the range of about 5 parts to about 70 parts by weight per 100 parts by weight of the said cellulose ester, and the said cellulose ester being characterized by an acetyl-palmityl content within the range of about 18.1% acetyl—44.8% palmityl to about 35.6% acetyl—16.3% palmityl, a melting point within the range of about 130° C. to about 220° C. and a moisture absorption of not more than 5.5%, the said article being resistant to the action of alkaline washing solutions.

13. An article comprising a plurality of layers of cloth adhered by means of a bonding composition including a mixed fatty acid ester of cellulose containing from about 10% to about 35.6% acetyl and an amount of another acyl group sufficient to give the said ester a melting point within the range of about 130° C. to about 220° C. and a moisture absorption of not more than 5.5%, the said cellulose ester constituting the major proportion of the said bonding composition, and the said article being characterized by resistance to alkaline washing solutions.

14. An article comprising a plurality of layers of cloth adhered by means of a bonding composition including a mixed fatty acid ester of cellulose containing from about 10% to about 35.6% acetyl and an amount of another acyl group sufficient to give the said ester a melting point within the range of about 130° C. to about 220° C. and a moisture absorption of not more than 5.5% and a plasticizer, the said cellulose ester constituting the major proportion of the said bonding composition, and the said article being characterized by resistance to alkaline washing solutions.

15. An article comprising a plurality of layers of cloth adhered by means of a bonding composition including a mixed fatty acid ester of cellulose containing from about 10% to about 35.6% acetyl and an amount of another acyl group sufficient to give the said ester a melting point within the range of about 130° C. to about 220° C. and a moisture absorption of not more than 5.5% and a resin compatible with the cellulose ester, the said cellulose ester constituting the major proportion of the said bonding composition, and the said article being characterized by resistance to alkaline washing solutions.

HARRY W. KLINGER.